Sept. 23, 1952 R. SERRELL 2,611,819
TELEVISION SIGNAL CONTROL SYSTEM
Filed Feb. 26, 1949
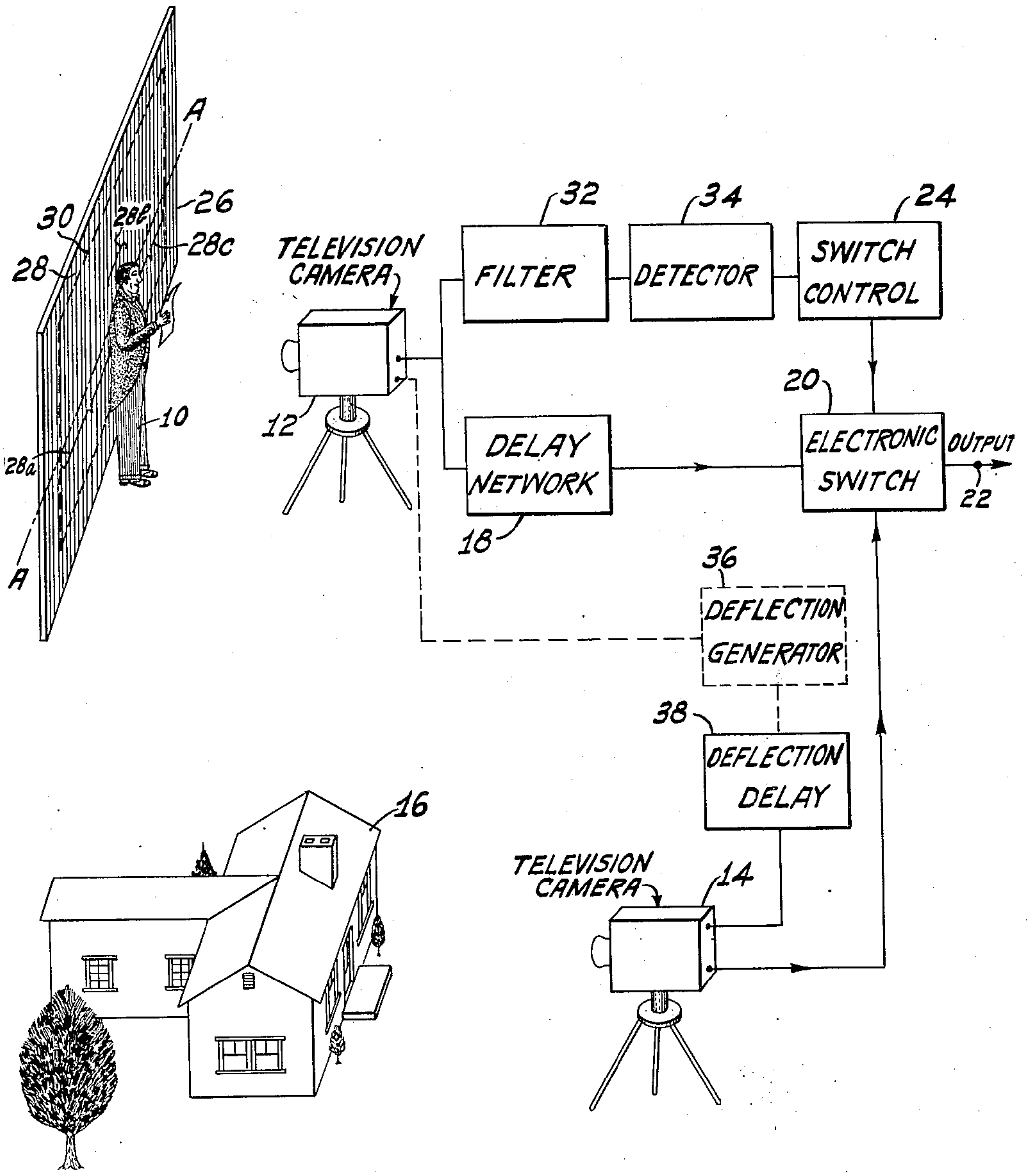
INVENTOR
Robert Serrell
BY John C. Mitchell
ATTORNEY Patented Sept. 23, 1952 2,611,819

UNITED STATES PATENT OFFICE 2,611,819

TELEVISION SIGNAL CONTROL SYSTEM

Robert Serrell, Princeton, N. J., assignor to Radio Corporation of America, a corporation of Delaware Application February 26, 1949, Serial No. 78,628

2 Claims. (Cl. 178—7.1)

The present invention relates to television switching and mixing systems for electrical signals derived from electro-optical scansion mechanisms.

In more particularity, the present invention deals with a novel control system for the switching or intermixing of television signals originating in two or more television cameras or a single television camera and other video signal sources.

In its more specific form, the present invention is concerned with a new and improved auto-optical control arrangement for the switched application of two or more television cameras or video signal sources to a common program channel to obtain a special "video effects" function permitting the reproduced super-imposition of two or more television signals upon one another without visibly disclosing the detached nature of the involved television signal sources.

In television programs, it is found to be often desirable to mix the output of two television cameras so that the reproduced image may in effect consolidate picture information derived from what may be two disassociated pick-up areas. For instance, it may be desirable to superimpose an advertising display situated in a television studio upon camera program material originating from an athletic field or other remote location. In another instance, it may be desired to superimpose the image of a person or object physically located in the local studio upon a scene being scanned at a remote studio or location of field pick up.

Merely mixing the output of one television camera or image scansion mechanism with another camera or image scansion mechanism does not always produce the desired results in that such simple superimposition results in a simulated transparency of one superimposed picture on the other. Thus, in the past a number of systems have been suggested for effectively disabling one television camera during the period in which information from the other television camera is being utilized thereby avoiding the possibility of concomitantly transmitting picture data corresponding to two images. Some such systems under controlled conditions have been, in some degree, successful, but have presented technical difficulties which have prevented reliable and realistic results over widely varying types of scenes.

In the mixing or superimposition of a studio television subject on a television scene remotely or otherwise produced, the present invention contemplates the use of a control pattern to be incorporated as an integral part of the background of the local studio television subject. The control pattern, in one of its more specific forms, comprises a plurality of alternately black and white vertical bars which are so spaced relative to the distance between the camera and the control pattern, to cause to be produced in the output of the camera, a control signal having a frequency substantially in excess of the highest video frequency for which the related television transmission equipment is designed to carry. By placing a television subject or object in front of this control pattern and scanning the same, the television camera will be productive of control signal only during intervals in which the television subject is not being scanned. The developed control signal is then utilized to control an electronic switch which selectively connects the output of the television camera and/or the output of another video signal source (such as another camera or film scanner) to a television program transmitting channel. In this way, the studio television subject is superimposed upon the remotely derived television signal image in such a way as to simulate the actual physical positioning of the television subject at the location of the remote television pick up.

It is therefore an object of the present invention to provide a simple and novel automatic control system for electro-optical scansion systems.

It is another purpose of the present invention to provide a novel system for combining the output of two synchronously related electro-optical scansion mechanisms remote from one another to simulate the actual presence of the scanned object of one scansion mechanism at or in the field of scansion of the second scansion mechanism.

It is further an object of the present invention to provide a novel special "video-effects" system for utilization in television program control arrangements wherein through the use of a special control pattern associated with a given television subject, switching between a television camera associated with this given subject and another television camera associated with a different subject may be effective with such speed and accuracy to opaquely superimpose the given subject upon the different subject.

It is another purpose of the present invention to provide an optical control pattern which may be associated with a television subject for scansion by a single television camera such to provide at the output of the television camera, a control signal suitable for use in establishing predetermined and complex control of the television camera output signal.

The invention possesses numerous other objects and features of advantage some of which together with the foregoing will be set forth in the following description of apparatus embodying and utilizing the invention. It is therefore to be understood that the present invention is applicable to other apparatus and that it is in no way limited to the particular system environment or apparatus shown herein as other advantageous embodiments in accordance with the teachings as set forth in the appended claims will occur to those skilled in the art after having benefited from the instruction of the following description taken in connection with the accompanying drawings in which the figure is a combination diagrammatic and block representation of one form of the present invention as applied to a television system.

Referring now to the figure, there is shown at 10 a television object positioned for electro-optical scansion by television camera or scanning device 12. It will be assumed for purpose of illustration that the subject 10 with the associated camera 12 is located in a television studio. Remotely located from the camera 12 is a second camera 14 positioned for pick up or scansion of a second subject 16. For purposes of illustration, the subject 16 has been chosen as a house representing one possible form of field television pick up.

In the embodiment shown of this present invention, the output of the camera 12 is applied through delay network 18 to an electronic switch 20, whose output 22 may be applied to a co-axial cable or other television video signal transmission system. The delay network may assume any convenient form such as a properly terminated transmission line of suitable length shown, for example, on page 174 of the Radio Engineers' Handbook by Frederick Terman, first edition. The output of the camera 14 is then applied to a second input of the electronic switch 20. Control of the electronic switch is established by means of switch control 24 which in the particular embodiment shown in the figure controls the electronic switch 20 in such a way as to connect the switch output 22 with either the output of the delay network 18 or the television camera 14. Thus, by means of the electronic switch 20, the transmission line connected with the output 22 may receive the television signals from either television camera 12 or television camera 14 depending upon the state of electronic switch 20.

According to the present invention a control pattern 26 is then placed behind the subject 10 at the studio location. The control pattern 26 in the form shown in the figure has impressed thereon a plurality of light and dark vertical lines 28. Thus, as the television camera 12 scans the presentation area defined by the dashed line 30, it will scan from left to right; along dotted line A—A; first, a plurality of vertical control pattern impressions embraced by brackets $28^a$, second, an area embraced by bracket $28^b$ on the object 10; and thirdly, more control impressions embraced by bracket $28^c$ on the control pattern 26.

Inasmuch as the control impressions 28 are in the example shown equally spaced, there will appear at the output of the camera 12 a periodically recurrent control signal whose frequency will be determined by the linear spacing of the control impressions or vertical lines 28 and the actual distance of the focal plane of camera 12 from the plane of the control pattern 26. A filter circuit 32 may then be connected with the output of the camera 12 so as to allow only passage of the developed control signal to the detector 34 when the television camera 12 scans the control pattern impressions 28. The filter, by way of example, may be of the simple tuned circuit type shown on page 153 of the above-referenced Radio Engineers' Handbook. The output of the detector 34 then activates the switch control 24 to actuate the electronic switch 20. A suitable detector for this purpose may be, for example, a simple half-wave rectifier circuit shown on page 592 of the above-referenced Radio Engineers' Handbook. Examples of suitable circuits for use as an electronic switch and switch control, corresponding to elements 20 and 24 of applicant's figure, are set forth in the following United States patents: J. K. Johnson, No. 2,426,454, issued August 24, 1947, entitled "Electronic Switch"; A. H. Dickinson, No. 2,447,799, issued August 24, 1948, entitled "Sequential Electronic Commutator With Supplementary Grid Control" (this patent also illustrating the use of a delay network); J. F. Farrington, No. 2,413,440, issued December 31, 1946, entitled "Electronic Switch."

Furthermore, a typical example of a television camera may be found in an article entitled "How to get the best picture out of your image orthicon camera" by H. Kozanowski appearing in the April 1949 issue of Broadcast News. Suitable deflection circuits for this camera are to be found in an article entitled "Television deflection circuits" by A. W. Friend appearing in the RCA Review for March 1947.

In the operation of the present invention, the switch control 24 acts upon the electronic switch 20 to connect the output of the camera 14 with the output terminals 22 only during generation of the control signal as passed and detected by the filter 32 and detector 34 respectively. During the intervals, however, that the control signal is not being developed, which intervals correspond to the actual scansion of areas on the object 10 by the camera 12 (such an area being embraced by bracket $28^b$), the switch control 24 (in the corresponding absence of the control signal influence) actuates the electronic switch 20 to connect the output of the television camera 12 through the delay network 18 to the output terminals 22, simultaneously disconnecting the television camera 14 from this output terminal.

Thus, it can be seen that if the television cameras 12 and 14 are held in synchronism with one another by means of a common deflection generator 36 or some other means of mutual synchronism, the television subject 10 will in effect be opaquely superimposed upon the subject 16 and to the extent discernible by inspection of the reproduced video signal applied to the terminals 22, the subject 10 will appear to be at the location of the subject 16. Since the camera 14 is disconnected from the output terminals 22 during actual scansion of the subject 10 and moreover the background or test pattern 26 disconnects the camera 12 from the output terminals 22 during the intervals corresponding to scansion of those areas of subject 16 in which the subject 10 is not to appear, there will be no evidence that two separate video signal sources are in fact being superimposed or otherwise mixed with one another.

In the practice of the present invention, it is convenient to so space the vertical control impressions on the control pattern 26, for a given distance from the camera 12, to produce a control signal substantially in excess of the highest frequency utilized by the television transmission system as a whole. For example, for a 4½ megacycle bandwidth transmission system, the control pattern 26 may be made to produce a 6 megacycle control signal in the output of the television camera 12. Since the television transmission equipment will not normally transmit such a high frequency, the 6 megacycle control signal is confined to the studio location and may be used for any control purpose such as, for example, the one hereinbefore described.

The filter 32 will, in practice, effect a certain time delay in the action of the developed control signal to control the electronic switch 20. In order to compensate for this delay in the filter 32, which is, for example, a function of the Q of the filter, a second delay network 18 having an equivalent time delay is inserted between the output of the television camera 12 and its connection to the electronic switch 20. Furthermore, it may be further desirable to incorporate a third delay network 38 between the common source of deflection signal 36 and the television camera 14 which deflection delay network will have a delay constant equivalent to the delay network 18 or the filter 32. This will, of course, permit more accurate positioning of the object 10 upon any given portion of the scanning area of the television camera 14.

A particularly useful application of the present system is found in the superimposition of, say an image, such as 10 upon a television image derived from the scansion of a motion picture film or other photographically recorded subject matter. Thus, a studio position may be given a simulated program environment established by any number of various photographic recordings.

It will be apparent from the teachings of the present invention that the control signal may not necessarily be developed and detected by and at the output of the television camera 12 but may be derived from an auxiliary scanning device, synchronized with the camera 12. Such an auxiliary scanning device may find use if it is desired to color the impressions on the control pattern 26 so that by means of a filter, the television camera 12 is unresponsive thereto.

It is moreover apparent that in order for the present invention to optimumly perform, the control impressions on the control pattern should be in focus on the scanning mosaic of the television camera 12 so as to produce well defined control signal. Many means for assuring a focused condition in such an optical arrangement are well known to the art such as, for example, the use of specially designed lenses for the camera 12.

A very interesting application of the present invention is found in connection with the color television systems wherein it is desired to provide different color shading effects for different portions of the control pattern. By way of example, the control pattern impressions may only cover a predetermined portion of the scanned television presentation area, and the video effects switching action arranged to produce monochromatic or black and white image transmission for one portion of the scene while producing full color of the transmission of other portions of the scene.

Although the present invention has been illustrated in connection with a television system, it is clear that its usefulness is in no way limited thereto. A control pattern such as 26 may be associated with any subject being scanned by any electro-optical process to develop a peculiar control signal in the output of the scanning device. The use of such a control signal when developed according to the present invention is again a matter of choice and the showing of the drawings merely being exemplary of one form of "special video effects" which may be obtained in connection with television broadcasting techniques.

What is claimed is:

1. A television system wherein image signals are to be provided from a plurality of television cameras and said image signals are to be selected for transmission, a plurality of television cameras, each camera having scanning means whereby to produce image signals, means presenting an exposed area to be scanned by one of said cameras, said area having a pattern of marks thereon, said marks being successively spaced with respect to a scanning path in said one camera whereby said one camera generates a signal having a characteristic determined by said marks and their successive disposition on said area, filter means connected to the output of said one camera, said filter means selecting and passing substantially only said signal generated by scanning of said marks, switching means, a detector for providing a switch control signal connected to said filter means and to said switching means, phase delay means connected to the output of said one camera, said switching means having a plurality of image signal input connections, an image signal transmission connection from said phase delay means to said switching means, said switching means having an image signal output connection, and an image signal transmission connection from another of said cameras to said second image signal input connection of said switching means, said switching means serving to connect said one camera to said image signal output connection upon interposition of an object to be scanned by said one camera between said one camera and said area having a pattern of marks.

2. A television system wherein image signals are to be provided from a plurality of television cameras and said image signals are to be selected for transmission, a plurality of television cameras, each camera having scanning means whereby to produce image signals, at least one of said cameras having means to delay operation of its scanning function, means presenting an exposed area to be scanned by one of said cameras, said area having a pattern of marks thereon, said marks being successively spaced with respect to a scanning path in said one camera whereby said one camera generates a signal having a characteristic determined by said marks and their successive disposition on said area, filter means connected to the output of said one camera, said filter means selecting and passing substantially only said signal generated by scanning of said marks, switching means, a detector for providing a switch control signal connected to said filter means and to said switching means, phase delay means connected to the output of said one camera, said switching means having a plurality of image signal input connections, an image signal transmission connection from said phase delay means to said switching means, said switching means having an image signal output connection, and an image signal transmission connection from another of said cameras to said second image signal input connection of said switching means, said switching means serving to connect said one camera to said image signal output connection upon interposition of an object to be scanned by said one camera between said one camera and said area having a pattern of marks.

ROBERT SERRELL.

REFERENCES CITED

The following references are of record in the file of this patent:

UNITED STATES PATENTS

| Number | Name | Date |
|---|---|---|
| 2,073,370 | Goldsmith | Mar. 9, 1927 |
| 2,099,980 | Iams | Nov. 23, 1937 |
| 2,164,297 | Bedford | June 27, 1939 |
| 2,172,936 | Goldsmith | Sept. 12, 1939 |
| 2,193,869 | Goldsmith | Mar. 19, 1940 |
| 2,251,525 | Rosenthal | Aug. 5, 1941 |
| 2,385,563 | Beers | Sept. 25, 1945 |
| 2,476,698 | Clapp | July 19, 1949 |